US012657740B2

(12) United States Patent
Zhang et al.

(10) Patent No.: US 12,657,740 B2
(45) Date of Patent: Jun. 16, 2026

(54) METHOD FOR DETERMINING TRACKING TARGET AND ELECTRONIC DEVICE

(71) Applicant: Huawei Technologies Co., Ltd., Shenzhen (CN)

(72) Inventors: Chao Zhang, Beijing (CN); Jian Xu, Shenzhen (CN); Yaqi Zhang, Beijing (CN); Hongma Liu, Beijing (CN); Zhiping Jia, Xi'an (CN); Shuailin Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 18/259,718

(22) PCT Filed: Dec. 17, 2021

(86) PCT No.: PCT/CN2021/139276
§ 371 (c)(1),
(2) Date: Jun. 28, 2023

(87) PCT Pub. No.: WO2022/143230
PCT Pub. Date: Jul. 7, 2022

(65) Prior Publication Data
US 2024/0062392 A1     Feb. 22, 2024

(30) Foreign Application Priority Data

Dec. 29, 2020     (CN) .......................... 202011607731.4

(51) Int. Cl.
*G06T 7/246*     (2017.01)

(52) U.S. Cl.
CPC .......... *G06T 7/248* (2017.01); *G06T 2200/24* (2013.01); *G06T 2207/10016* (2013.01); *G06T 2207/20101* (2013.01)

(58) Field of Classification Search
None
See application file for complete search history.

(56) References Cited

U.S. PATENT DOCUMENTS

| | | | | |
|---|---|---|---|---|
| 7,712,046 B2 * | 5/2010 | Ngari | ......................... | G06F 3/14 |
| | | | | 715/800 |
| 9,086,800 B2 * | 7/2015 | Lim | ..................... | G06F 3/04883 |
| 9,389,722 B2 * | 7/2016 | Matsuki | .................. | G06F 3/041 |
| 9,459,775 B2 * | 10/2016 | Kuscher | ................ | G06F 3/0488 |
| 10,803,604 B1 * | 10/2020 | Gui | .......................... | G06T 7/215 |

(Continued)

FOREIGN PATENT DOCUMENTS

| | | |
|---|---|---|
| CN | 105678809 A | 6/2016 |
| CN | 105827952 A | 8/2016 |

(Continued)

*Primary Examiner* — Randolph I Chu
(74) *Attorney, Agent, or Firm* — Slater Matsil, LLP

(57)     ABSTRACT

An electronic device obtains N frames of images, and then obtains a first operation performed by a user on a target object on a screen. The electronic device displays a target box whose area cyclically changes, obtains information about the target box in an $N^{th}$ frame of image based on a second operation performed by the user on the target object, and determines a feature vector of the target object based on the information about the target box.

20 Claims, 15 Drawing Sheets

(56)           References Cited

U.S. PATENT DOCUMENTS

| | | | |
|---|---|---|---|
| 2009/0303342 A1* | 12/2009 | Corcoran | G06T 7/251 |
| | | | 348/222.1 |
| 2011/0316887 A1* | 12/2011 | Fan | G06F 3/04886 |
| | | | 345/661 |
| 2015/0104067 A1 | 4/2015 | Liu | |
| 2018/0040134 A1* | 2/2018 | Feldman | G06T 7/254 |
| 2019/0122064 A1 | 4/2019 | Ishikawa et al. | |
| 2019/0279681 A1 | 9/2019 | Yuan et al. | |
| 2020/0162682 A1 | 5/2020 | Cheng et al. | |

FOREIGN PATENT DOCUMENTS

| | | | | | |
|---|---|---|---|---|---|
| CN | 106375682 A | | 2/2017 | | |
| CN | 106780558 A | | 5/2017 | | |
| CN | 107066990 A | | 8/2017 | | |
| CN | 107491742 A | | 12/2017 | | |
| CN | 107526515 A | | 12/2017 | | |
| CN | 108259703 A | | 7/2018 | | |
| CN | 108830219 A | | 11/2018 | | |
| CN | 109325967 A | | 2/2019 | | |
| CN | 109831622 A | | 5/2019 | | |
| CN | 110503042 A | | 11/2019 | | |
| CN | 110689556 A | | 1/2020 | | |
| CN | 111316630 A | | 6/2020 | | |
| CN | 111340736 A | * | 6/2020 | | G06F 3/04845 |
| CN | 111382705 A | | 7/2020 | | |
| CN | 111815669 A | | 10/2020 | | |
| CN | 112119427 A | | 12/2020 | | |
| JP | 2008109552 A | | 5/2008 | | |

* cited by examiner

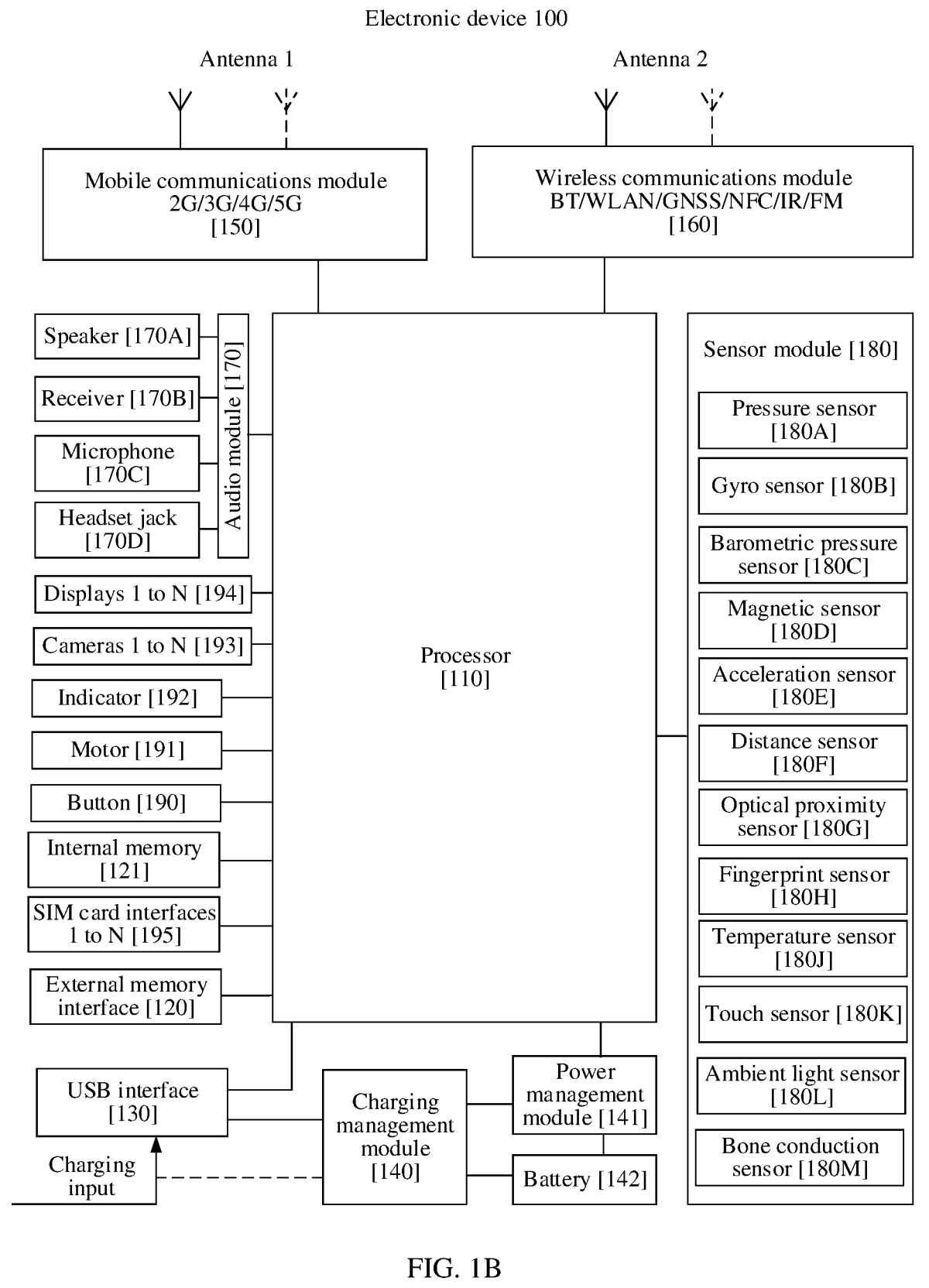

Electronic device 100

Antenna 1                    Antenna 2

| Mobile communications module 2G/3G/4G/5G [150] | Wireless communications module BT/WLAN/GNSS/NFC/IR/FM [160] |

Speaker [170A]

Receiver [170B]

Microphone [170C]

Headset jack [170D]

Audio module [170]

Displays 1 to N [194]

Cameras 1 to N [193]

Indicator [192]

Motor [191]

Button [190]

Internal memory [121]

SIM card interfaces 1 to N [195]

External memory interface [120]

Processor [110]

Sensor module [180]

Pressure sensor [180A]

Gyro sensor [180B]

Barometric pressure sensor [180C]

Magnetic sensor [180D]

Acceleration sensor [180E]

Distance sensor [180F]

Optical proximity sensor [180G]

Fingerprint sensor [180H]

Temperature sensor [180J]

Touch sensor [180K]

Ambient light sensor [180L]

Bone conduction sensor [180M]

USB interface [130]

Charging input

Charging management module [140]

Power management module [141]

Battery [142]

FIG. 1B

| Tracking target | Feature of the tracking target |
|---|---|
|  | F1(N)=[X1, X2, X3, ..., Xn] |

METHOD FOR DETERMINING TRACKING TARGET AND ELECTRONIC DEVICE

CROSS-REFERENCE TO RELATED APPLICATIONS

This application is a national stage of International Application No. PCT/CN2021/139276, filed on Dec. 17, 2021, which claims priority to Chinese Patent Application No. 202011607731.4, filed on Dec. 29, 2020. Both of the aforementioned applications are hereby incorporated by reference in their entireties.

TECHNICAL FIELD

This application relates to the field of video processing, and in particular, to a method for determining a tracking target and an electronic device.

BACKGROUND

Most of current electronic devices have video shooting functions. When a user shoots a video, a video footage may follow a specified target in the video. To be specific, the user does not need to manually adjust the video footage, and the video footage changes with movement of the specified target, so that the specified target always stays at a central position of the video footage. The foregoing function may be referred to as target tracking.

In a current technology, a specified target that needs to be tracked is selected in a manner of target detection and a single tap of the user to determine the tracking target. Before the user taps the specified target, the electronic device starts target detection, detects a position and a size of an object of a specified category in the video footage, and displays the object in a target box. When a tap coordinate of the user is located in a target box, it is determined that an object in the target box is a specified target that needs to be tracked. A disadvantage of the current technology is that an object category that can be detected through target detection is limited, and tracking of any object cannot be implemented. In addition, limited by a target detection algorithm, if the size of the object does not meet a requirement of the algorithm, the electronic device cannot detect the target. In addition, running the target detection algorithm consumes processor resources and increases power consumption.

SUMMARY

According to a method for determining a tracking target and an electronic device that are provided in this application, a user can quickly and conveniently determine a tracking target in a target tracking mode in a video recording scenario, and a range in which the user selects the tracking target can be improved, to achieve an objective of tracking more types of targets.

According to a first aspect, this application provides a video shooting method. An electronic device obtains N frames of images, and then obtains a first operation performed by a user on a target object on a screen. The electronic device displays a target box whose area cyclically changes, obtains information about the target box in an N, frame of image based on a second operation performed by the user on the target object, and determines a feature vector of the target object based on the information about the target box.

With reference to the first aspect, it may be understood that, in some implementations, after the displaying a target box whose area cyclically changes, the method further includes: determining whether the user performs a third operation on the target object; and if there is the third operation, determining whether the user performs a fourth operation on the target object.

With reference to the first aspect, it may be understood that, in some other implementations, if the user does not perform the third operation on the target object, it is determined whether the user performs the second operation; and if the user does not perform the second operation, the target box whose area cyclically changes continues to be displayed; or if the user performs the second operation, the information about the target box in the $N^{th}$ frame of image is obtained.

With reference to the first aspect, it may be understood that, in some other implementations, if it is determined that the user performs the fourth operation on the target object, the fourth operation is obtained; it is determined whether the user cancels the fourth operation; and if the user does not cancel the fourth operation, the fourth operation performed by the user on the target object continues to be obtained; or if the user cancels the fourth operation, it is determined whether the user performs the second operation on the target object.

With reference to the first aspect, it may be understood that, in some other implementations, if it is determined that the user does not perform the fourth operation on the target object, the second operation performed by the user on the target object is obtained.

With reference to the first aspect, it may be understood that, in some other implementations, if the user performs the second operation on the target object, the second operation is obtained; it is determined whether the user cancels the second operation; and if the user does not perform the second operation on the target object, the information about the target box in the $N^{th}$ frame of image is obtained.

With reference to the first aspect, it may be understood that, in some other implementations, if the user cancels the second operation, the information about the target box in the $N^{th}$ frame of image is obtained; or if the user does not cancel the second operation, the second operation continues to be obtained.

With reference to the first aspect, it may be understood that, in some other implementations, the first operation is a tap operation, the second operation is a secondary tap operation, the third operation is a touch and hold operation, and the fourth operation is a drag operation.

With reference to the first aspect, it may be understood that, in some other implementations, the information about the target box includes an area and a position of the target box.

According to a second aspect, this application provides an electronic device, including a screen, a memory, and a processor. The screen receives an operation performed by a user on a target object on the screen.

The memory is configured to store a computer program.

The processor is configured to invoke the computer program, so that the electronic device performs the method according to any implementation of the first aspect.

According to a third aspect, this application provides a computer storage medium, including computer instructions. When the computer instructions are run on an electronic device, the electronic device is enabled to perform the method according to any implementation of the first aspect.

BRIEF DESCRIPTION OF THE DRAWINGS

FIG. 1B is a schematic diagram of a hardware structure of an electronic device 100 according to an embodiment of this application;

DETAILED DESCRIPTION OF ILLUSTRATIVE EMBODIMENTS

The following describes technical solutions in embodiments of this application with reference to accompanying drawings in embodiments of this application. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features. In the descriptions of embodiments of this application, unless otherwise specified, "a plurality of" means two or more than two.

The following describes application scenarios in embodiments of this application and related terms required in embodiments of this application.

(1) Target Tracking

Figure 1A:
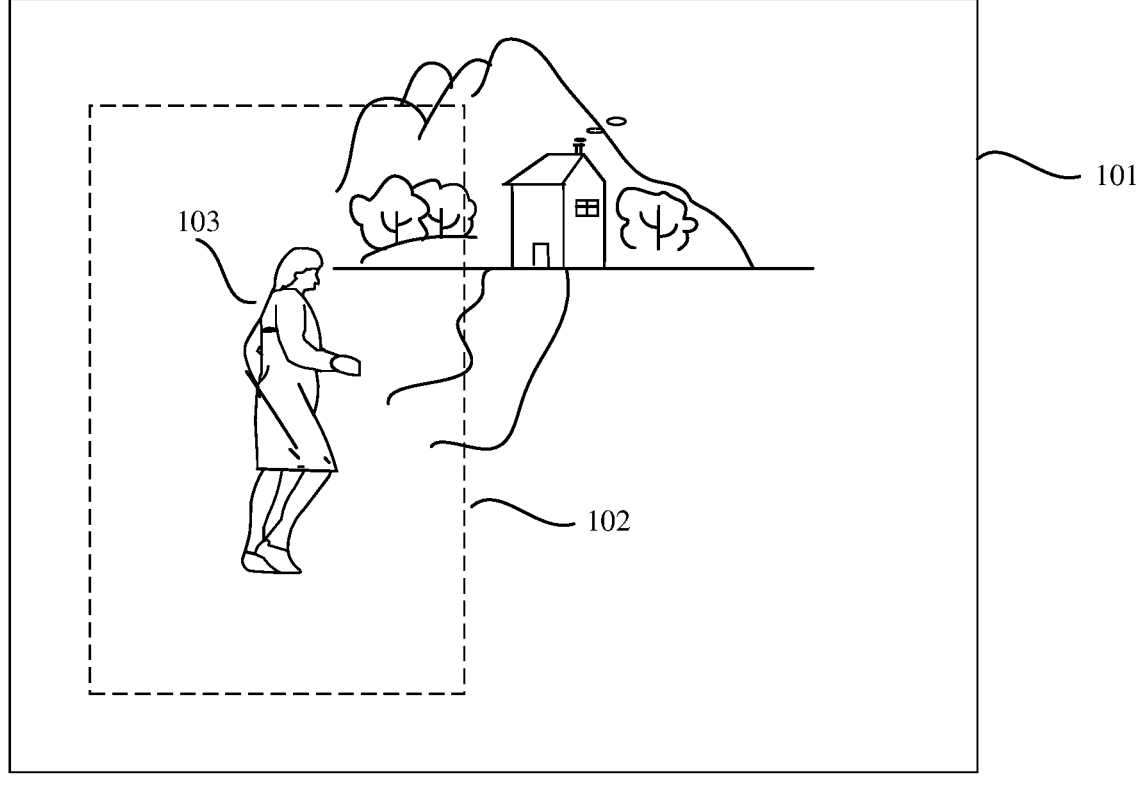
FIG. 1A is a schematic diagram of an image frame obtained by an electronic device according to an embodiment of this application.

An electronic device with a video shooting function may track and shoot a specific object in a video footage during video shooting, that is, target tracking. There are two manners of target tracking. In a first manner, first, an image signal processor (image signal processor, ISP) of the electronic device obtains a frame of wide-angle image. As shown in FIG. 1A, the wide-angle image obtained by the ISP is an image 101. If it is determined that a tracking target is a person 103, a part of the image (for example, an image 102) is obtained through cropping by using the person 103 as a center, a size of the image 102 is re-determined, and a resolution of the cropped image is fixed (for example, the resolution is fixed to 1080p). Then, the processed image is displayed on a screen and displayed to a user. In a second manner, an auxiliary device (for example, a gimbal) is used. The auxiliary device can rotate and switch a lens as the user moves to adjust different fields of view, so that the specified target can be continuously shot. The first of the foregoing two manners is used for target tracking in this application.

A camera of the electronic device may obtain consecutive image frames, and the user may select a tracking target in an $N^{th}$ frame in the consecutive image frames displayed by the electronic device. The target tracking in embodiments of this application may alternatively be that the electronic device may determine, in consecutive image frames after an $N^{th}$ frame of image (for example, an $(N+_1)^{th}$ frame), the tracking target selected by the user. The electronic device may mark the tracking target in the image frame.

In this application, the electronic device is a device that can display consecutive image frames, for example, a mobile phone, a tablet computer, a desktop computer, or a television. The electronic device is not limited in embodiments of this application. In embodiments of this application, one frame of image displayed by the electronic device may be referred to as an image frame or an $N^{th}$ frame of image.

(2) Tracking Target

In embodiments of this application, a specific object (for example, a person, a plant, an animal, or a car) determined by the user in the $N^{th}$ frame of image is referred to as a tracking target.

(3) Neural Network

The neural network may include a neuron. The neuron may be an operation unit that uses $x_s$ and an intercept 1 as inputs. For an output of the operation unit, refer to the following formula (1):

$$h_{W,b}(x) = f(W^T x) = f\left(\sum_{s=1}^{n} W_s x_s + b\right) \tag{1}$$

s=1, 2, . . . , and n. n is a natural number greater than 1, $W_s$ is a weight of $x_s$, and b is a bias of the neuron. $f$ is an activation function (activation function) of the neuron, and is used to introduce a non-linear feature into the neural network, to convert an input signal in the neuron into an output signal. The output signal of the activation function may be used as an input of a next layer of convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(4) Convolutional Neural Network

The convolutional neural network (convolutional neuron network, CNN) is a neural network with a convolutional structure. The convolutional neural network includes a feature extractor including a convolutional layer and a sub-sampling layer. The feature extractor may be considered as a filter. A convolution process may be considered as using a trainable filter to perform convolution on an input image or a convolutional feature map (feature map). The convolutional layer is a neuron layer that is in the convolutional neural network and at which convolution processing is performed on an input signal. In the convolutional layer of the convolutional neural network, one neuron may be connected to only some adjacent-layer neurons. One convolutional layer usually includes several feature maps, and each feature map may include some neurons that are in a rectangular arrangement. Neurons in a same feature map share a weight, and the shared weight here is a convolution kernel. Weight sharing may be understood as that an image information extraction manner is irrelevant to a position. An implicit principle of this is that statistical information of a part of an image is the same as that of another part. This means that image information learned in a part can also be used in another part. Therefore, same image information obtained through learning can be used for all positions on the image. In a same convolutional layer, a plurality of convolution kernels may be used to extract different image information. Usually, a larger quantity of convolution kernels indicates richer image information reflected by a convolution operation.

The convolution kernel may be initialized in a form of a matrix of a random size, and in a training process of the convolutional neural network, the convolution kernel may obtain a proper weight through learning. In addition, a direct benefit of weight sharing is to reduce connections between layers of the convolutional neural network and reduce a risk of overfitting.

(5) Feature Matching Algorithm

In the feature matching algorithm used in this application, a feature (for example, the feature is 6*6*128) of a target partial image of the tracking target is used as a convolution kernel, and convolution is performed on an image frame feature map (for example, a feature is 22*22*128), to obtain a score map (Score map). The Score map is a score matrix (for example, a matrix of 17*17). A point (a region on a corresponding image frame) with a higher score on the Score map indicates that the region on the corresponding image frame is more similar to a feature of a target, that is, a possibility that the region is a position of the tracking target is higher.

(6) Center Weighting Algorithm

One cosine window is added to the Score map obtained in the feature matching algorithm, that is, each point in the score matrix is multiplied by one coefficient. A central point corresponds to a position of a target in a previous frame, and a coefficient is 1. Spreading outward from the central point, each point is multiplied by an increasing small coefficient. This indicates that a penalty for a point far from the center increases.

The following describes an example of an electronic device 100 provided in the following embodiments of this application.

FIG. 1B is a schematic diagram of a structure of an electronic device 100.

The following uses the electronic device 100 as an example to describe this embodiment in detail. It should be understood that the electronic device 100 shown in FIG. 1B is merely an example, and the electronic device 100 may have more or fewer components than those shown in FIG. 1, may combine two or more components, or may have different component configurations. Various components shown in the figure may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

A wireless communications function of the electronic device 100 may be implemented through the antenna 1, the antenna 2, the mobile communications module 150, the wireless communications module 160, the modem processor, the baseband processor, and the like.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1. The display 194 may accept a tap or slide operation of a user, to determine a tracking target in video shooting.

The electronic device 100 can implement a shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. For touch operations performed on different regions of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

Figure 1C:
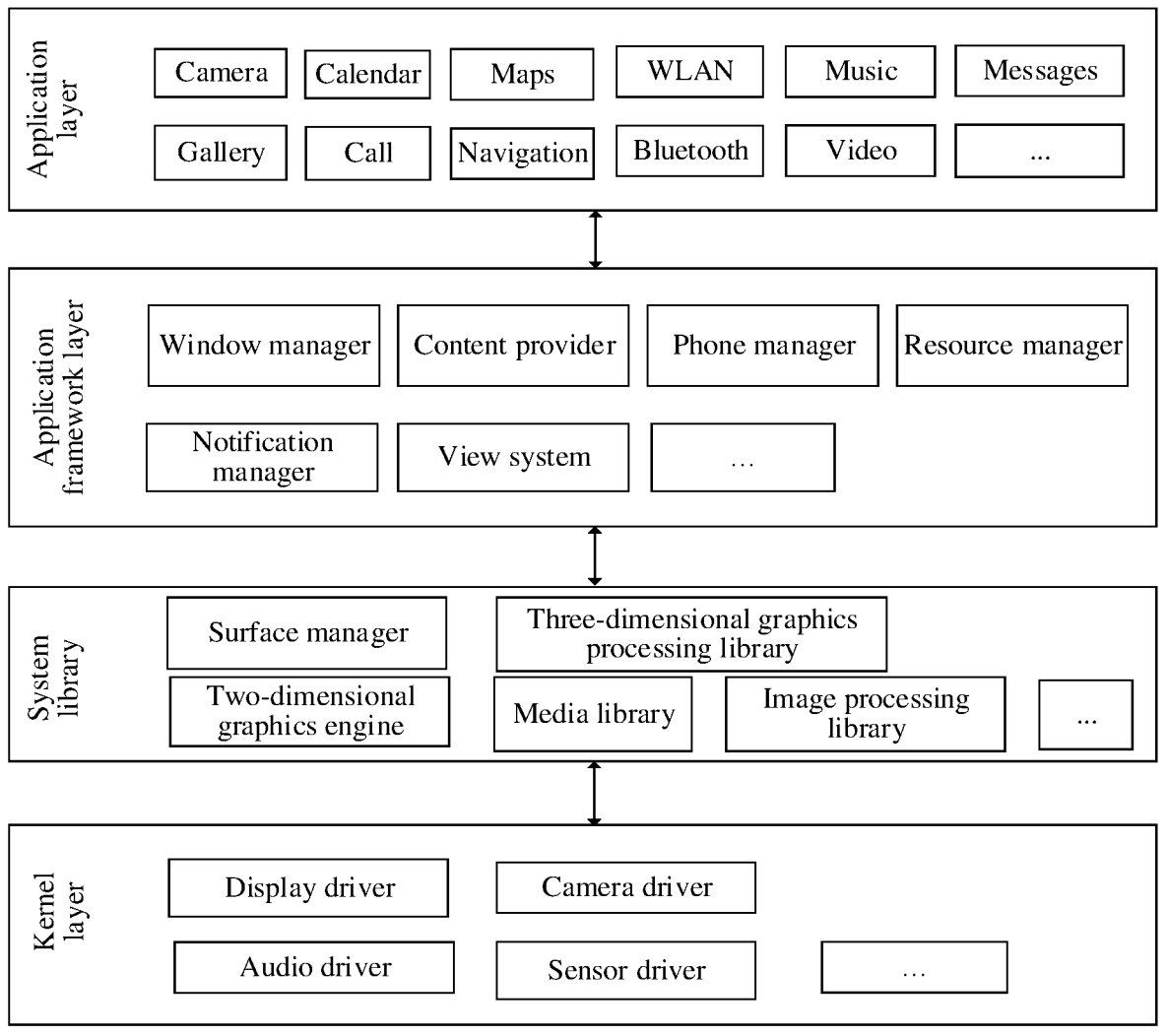
FIG. 1C is a schematic diagram of a software structure of an electronic device 100 according to an embodiment of this application.

FIG. 1C is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 1C, the application package may include applications such as Camera, Gallery, Calendar, Call, Maps, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 1C, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying a picture. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background or a notification that appears on a screen in a form of a dialog window. For example, text information is displayed in the status bar, an announcement is given, the electronic device vibrates, or the indicator light blinks.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes some typical shooting scenarios involved in this application.

Figure 2A:
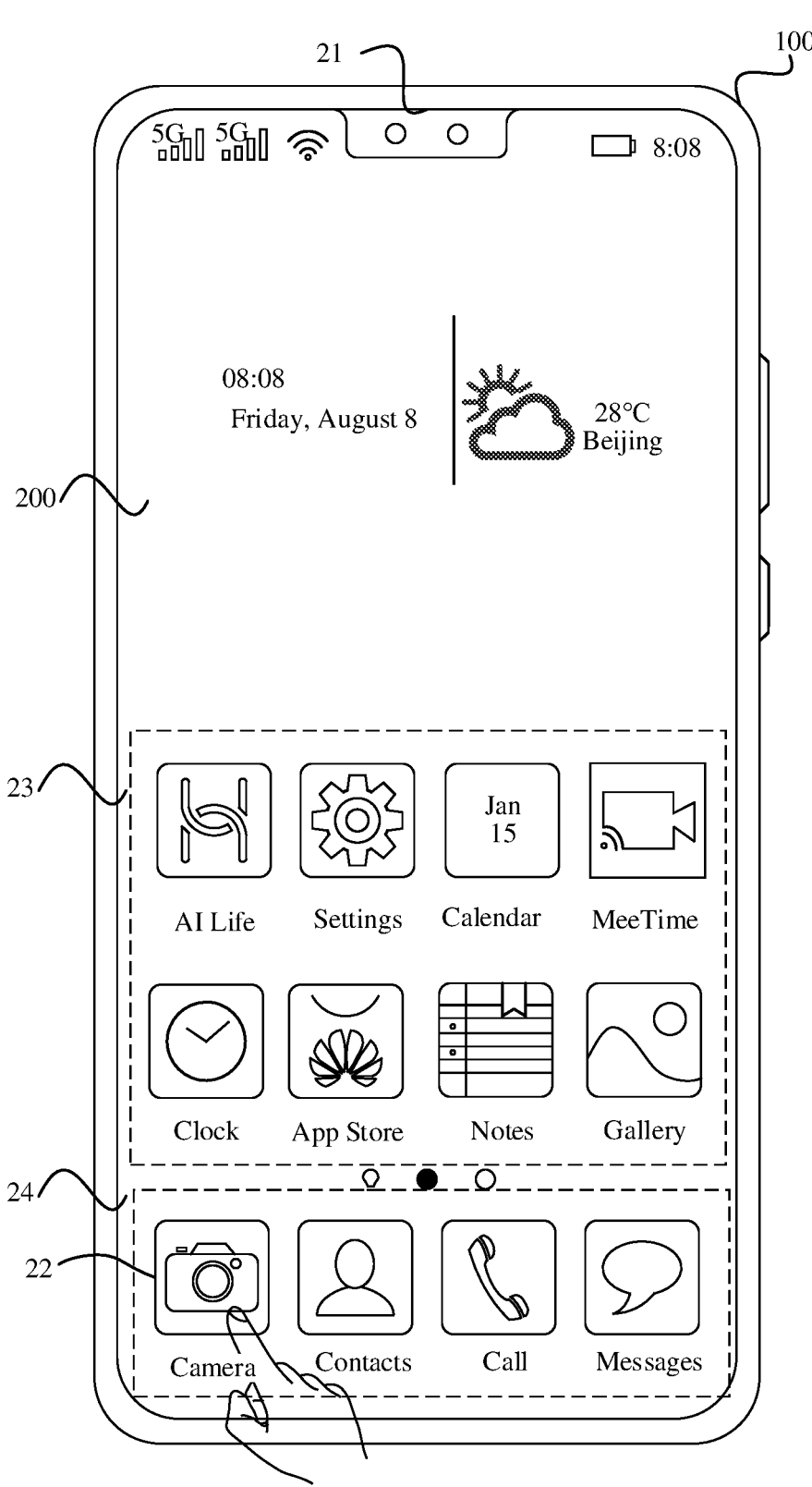
FIG. 2A to FIG. 2J are schematic diagrams of some user interfaces in which an electronic device 100 receives a user operation to determine a tracking target according to an embodiment of this application.

As shown in FIG. 2A, an electronic device 100 may include a camera 21. The camera 21 may be a front-facing camera. The camera 21 may further include a rear-facing camera. The electronic device 100 may display a user interface 200 shown in FIG. 2A. The user interface 200 may include an application icon display region 23, a taskbar 24 having a frequently used application icon.

The application icon display region 23 may include a gallery icon 231. In response to a user operation performed on the gallery icon 231, for example, a touch operation, the electronic device 100 may start a gallery application, to display information such as a picture and a video that are stored in the electronic device 100. The picture and the video that are stored in the electronic device 100 include a picture and a video that are taken by the electronic device 100 by using a camera application. The application icon display region 23 may further include more application icons, for example, icons such as AI Life, Settings, Calendar, MeeTime, Clock, App Store, and Notes. This is not limited in this embodiment of this application.

The taskbar 24 having the frequently used application icon may display a camera icon 22. In response to a user operation performed on the camera icon 22, for example, a touch operation, the electronic device 100 may start a camera application, to perform functions such as photographing and video recording. When starting the camera application, the electronic device 100 may start the camera 21 (the front-facing camera and/or the rear-facing camera), to implement the functions such as photographing and video recording. The taskbar 23 having the frequently used application icon may further display more application icons, for example, icons such as Call, Messages, and Contacts. This is not limited in this embodiment of this application.

The user interface 200 may further include more or less content, for example, a control for displaying current time and a current date, and a control for displaying weather. It may be understood that FIG. 2A shows merely an example of the user interface on the electronic device 100, and should not constitute a limitation on this embodiment of this application.

Figure 2B:
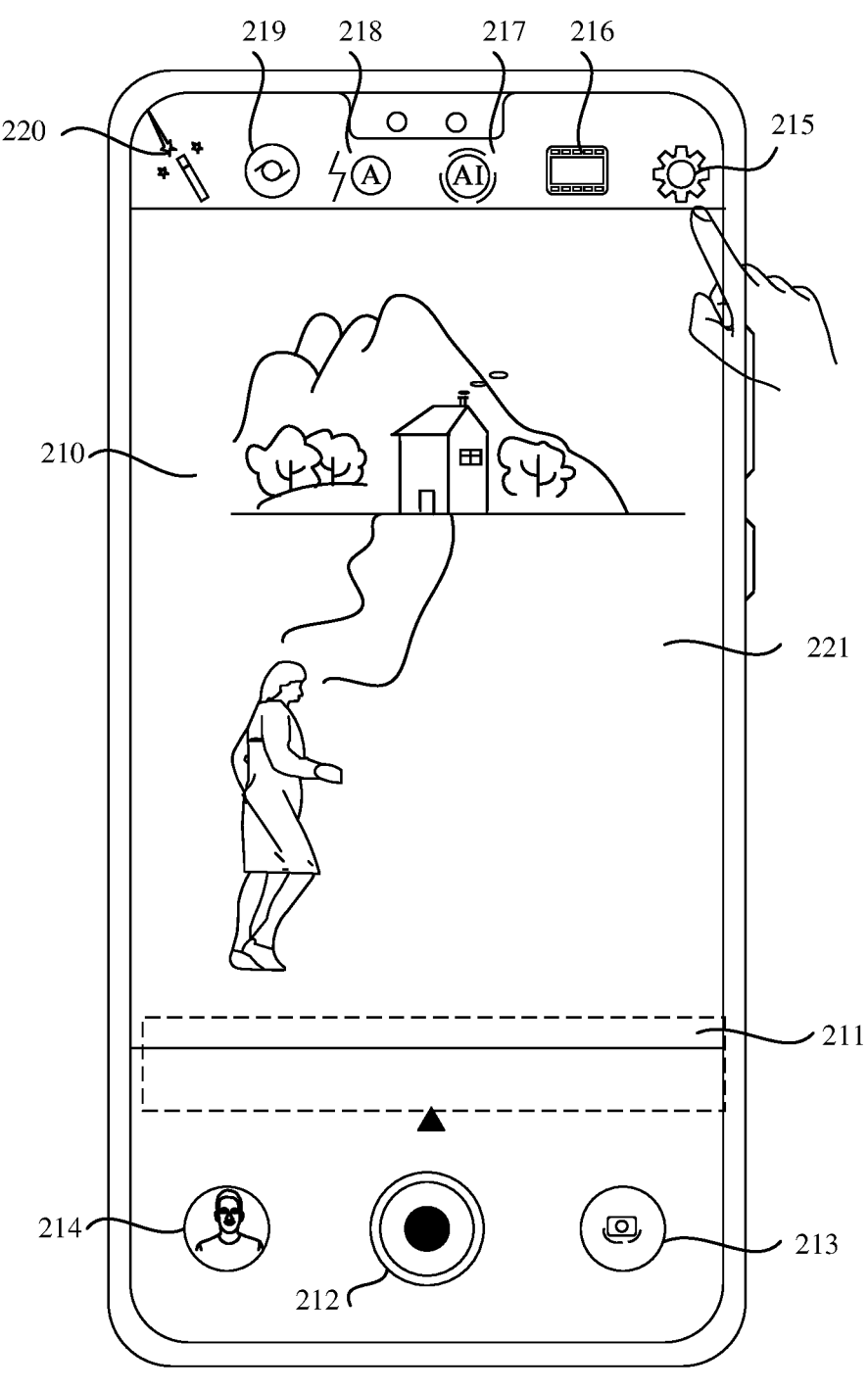
Figure 2C:
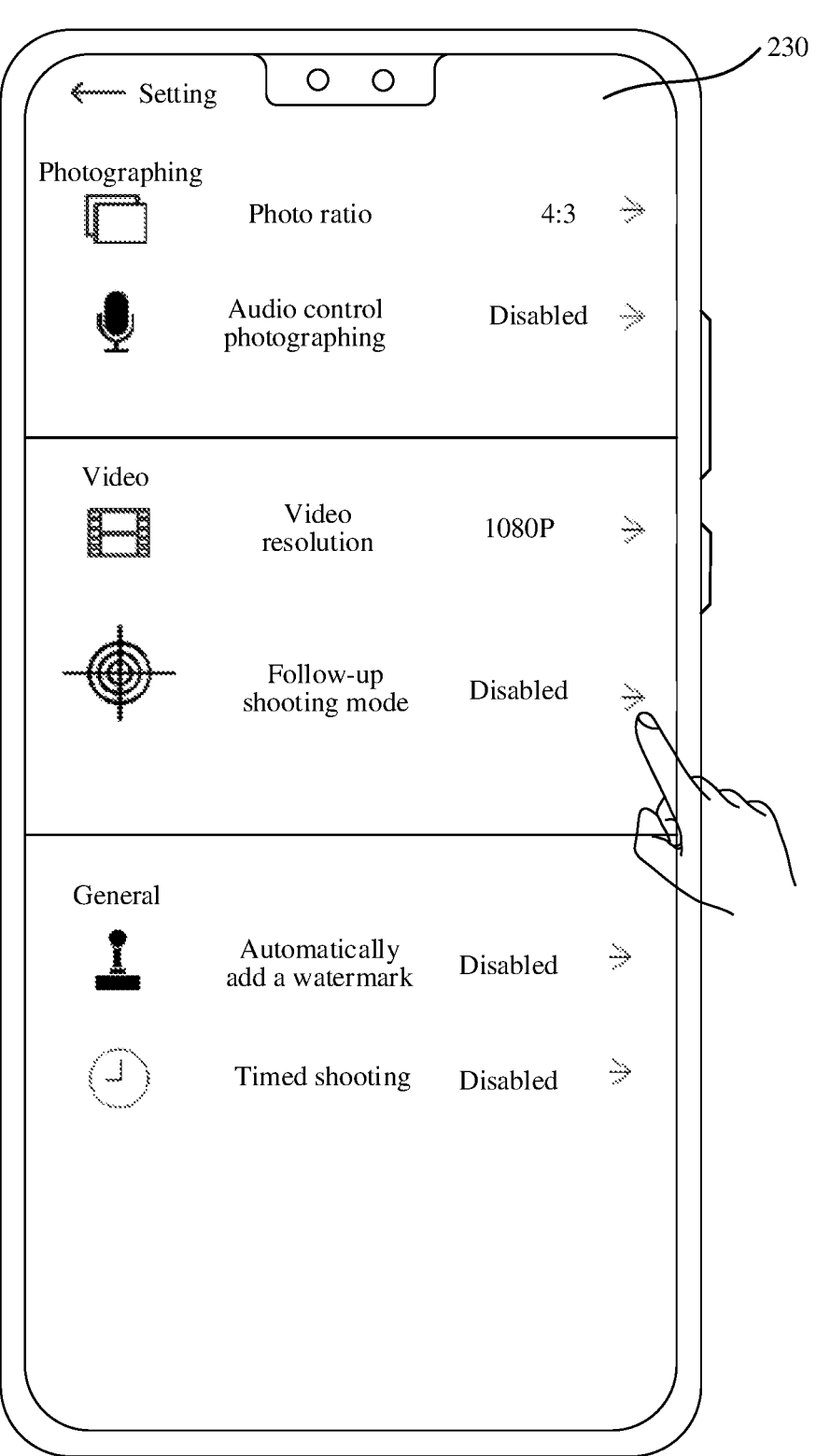

In response to the user operation performed on the camera icon 22, the electronic device 100 may display a user interface 210 shown in FIG. 2B. The user interface 210 may include a preview region 221, an editing control 220, a ratio adjustment control 219, a flash control 218, a smart object recognition control 217, a filter control 216, a setting control 215, a camera mode selection wheel 211, a gallery shortcut control 214, a shutter control 212, a camera flipping control 213, and the like.

The preview region 221 may be used to display an image captured by the camera 21 in real time. The electronic device may refresh displayed content in real time, so that a user previews the image currently captured by the camera 21.

The editing control 200 may be configured to add graffiti or an emoticon to the image currently captured in real time.

The ratio adjustment control 219 may be configured to adjust a display ratio of the currently displayed preview region 221, for example, 16:9 or 4:3.

The flash control 218 may be configured to turn on or off a flash.

The smart object recognition control 217 may be configured to recognize a category of the currently captured image by using an artificial intelligence algorithm, and perform corresponding processing.

The filter control 216 may be configured to simulate a filter of a camera to adjust a color of a light source.

The setting control 215 may be configured to adjust a parameter for photographing, and enable or disable some manners (such as timer photographing, smile snapshot, and audio control photographing) for photographing. The setting control 215 may be configured to set more other shooting functions, for example, setting an image ratio, setting a video resolution, setting a follow-up shooting mode, and setting a watermark. This is not limited in this embodiment of this application.

One or more shooting mode options may be displayed in the camera mode selection wheel 211. The one or more shooting mode options may include a night shot mode, a portrait mode, a photographing mode, a video recording mode, a professional mode, and the like. The one or more shooting mode options may be represented as text information on an interface, for example, "night", "portrait", "photo", "video", "professional", and "more". This is not limited thereto. The one or more shooting options may alternatively be represented as an icon or an interactive element (interactive element, IE) in another form on the interface. When detecting a user operation performed on a video recording mode option, the electronic device 100 may enable a shooting mode selected by the user. Not limited to that shown in FIG. 2B, the camera mode selection wheel 211 may include more or fewer shooting mode options. The user may browse another shooting mode option by sliding left/right in the camera mode selection wheel 211.

The gallery shortcut control 214 may be configured to start the gallery application. In response to a user operation performed on the gallery shortcut control 214, for example, a tap operation, the electronic device 100 may start the gallery application. This allows the user to conveniently view the photo and the video taken without exiting the camera application and then starting the gallery application. The gallery application is an application for managing a picture on an electronic device such as a smartphone or a tablet computer, and may also be referred to as an "album". A name of the application is not limited in this embodiment. The gallery application may support the user in performing various operations on the picture stored in the electronic device 100, for example, operations such as browsing, editing, deleting, and selecting.

The shutter control 212 may be configured to monitor a user operation that triggers photographing. The electronic device 100 may detect a user operation performed on the shutter control 212. In response to the operation, the electronic device 100 may store the image in the preview region 221 as a picture in the gallery application. In addition, the electronic device 100 may further display a thumbnail of the stored image in the gallery shortcut control 213. That is, the user may tap the shutter control 212 to trigger photographing. The shutter control 212 may be a button or a control in another form.

The camera flipping control 213 may be configured to monitor a user operation that triggers a flipping camera. The electronic device 100 may detect a user operation performed on the camera flipping control 213, for example, a tap operation. In response to the operation, the electronic device 100 may flip a camera for photographing, for example, switch a rear-facing camera to a front-facing camera, or switch a front-facing camera to a rear-facing camera.

The user interface 210 may further include more or less content. This is not limited in this embodiment of this application.

FIG. 2C to FIG. 2J show examples of user interfaces on which target tracking is used when the electronic device 100 performs video shooting.

As shown in FIG. 2B, a setting interface is entered in response to a tap operation performed by the user on the setting control 215. For example, the setting interface may be a user interface 230 shown in FIG. 2C. The user interface 230 may include but is not limited to a photographing-type setting option, a video-type setting option, a general-type setting option, and the like. The photographing-type setting option may include an image ratio option. For example, an image ratio may be 4:3. An audio control photographing option may be further included. For example, audio control photographing may be enabled or disabled. The video-type setting option may include a video resolution option, for example, 1080P, and may further include a tracking mode. For example, the tracking mode may be enabled or disabled, and in the tracking mode, the electronic device may use a target tracking function. The general-type setting option may include an option of automatically adding a watermark. For example, the option of automatically adding the watermark may be enabled or disabled. A timed shooting option may be further included. For example, the timed shooting option may be enabled or disabled.

Figure 2D:
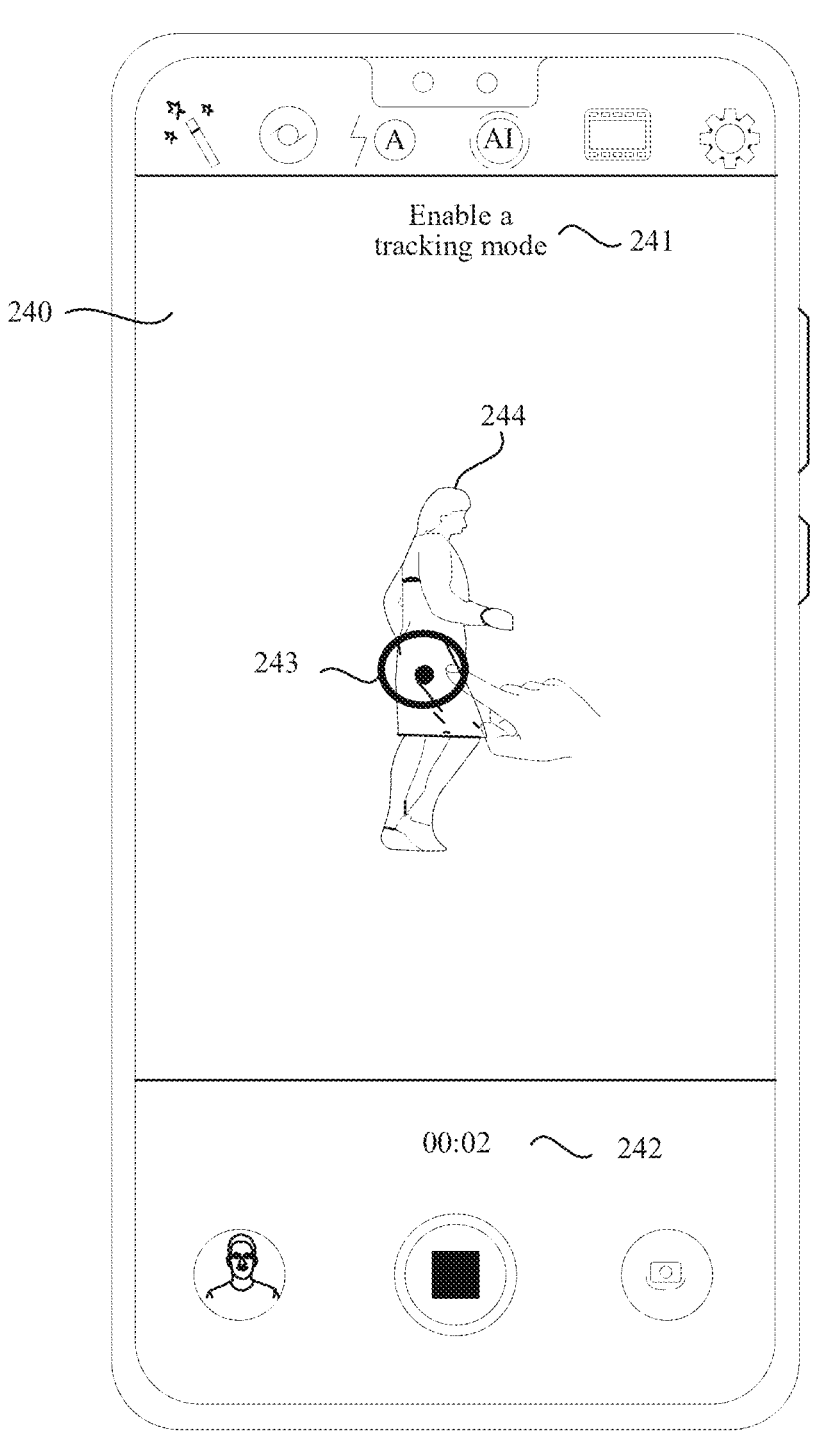

In response to a tap of the user on the tracking mode option, the tracking mode may be enabled or disabled. When the tracking mode is enabled, as shown in FIG. 2B, in response to a tap operation performed by the user on the shutter control 212, the electronic device 100 starts video recording, that is, video shooting. After video shooting starts, as shown in FIG. 2D, a user interface 240 is displayed on the electronic device. In the user interface 240, a tracking indication switch 241 is located at an upper position of the preview region.

The tracking indication switch 241 can indicate whether the target tracking mode is currently enabled, and the tracking mode may be enabled or disabled in response to an operation performed by the user on the tracking indication switch 241. When the target tracking mode is enabled, the user may perform an operation of determining a tracking target.

In the user interface 240, there is a person 244 (which may alternatively be any object). After video recording starts, a time control 242 is configured to display duration of video recording at a bottom of the user interface 240. After the electronic device 100 starts video recording, the user may tap the person 244 in the user interface 240, and a target box 243 whose center is a touch position appears at a position tapped by the user.

The target box 243 may be a circle or may be in another shape. A shape of the target box is not limited in this application. In some embodiments, when the tracking mode is enabled, after the user taps the person 244, a size of the target box 243 changes as time changes.

Figure 2E:
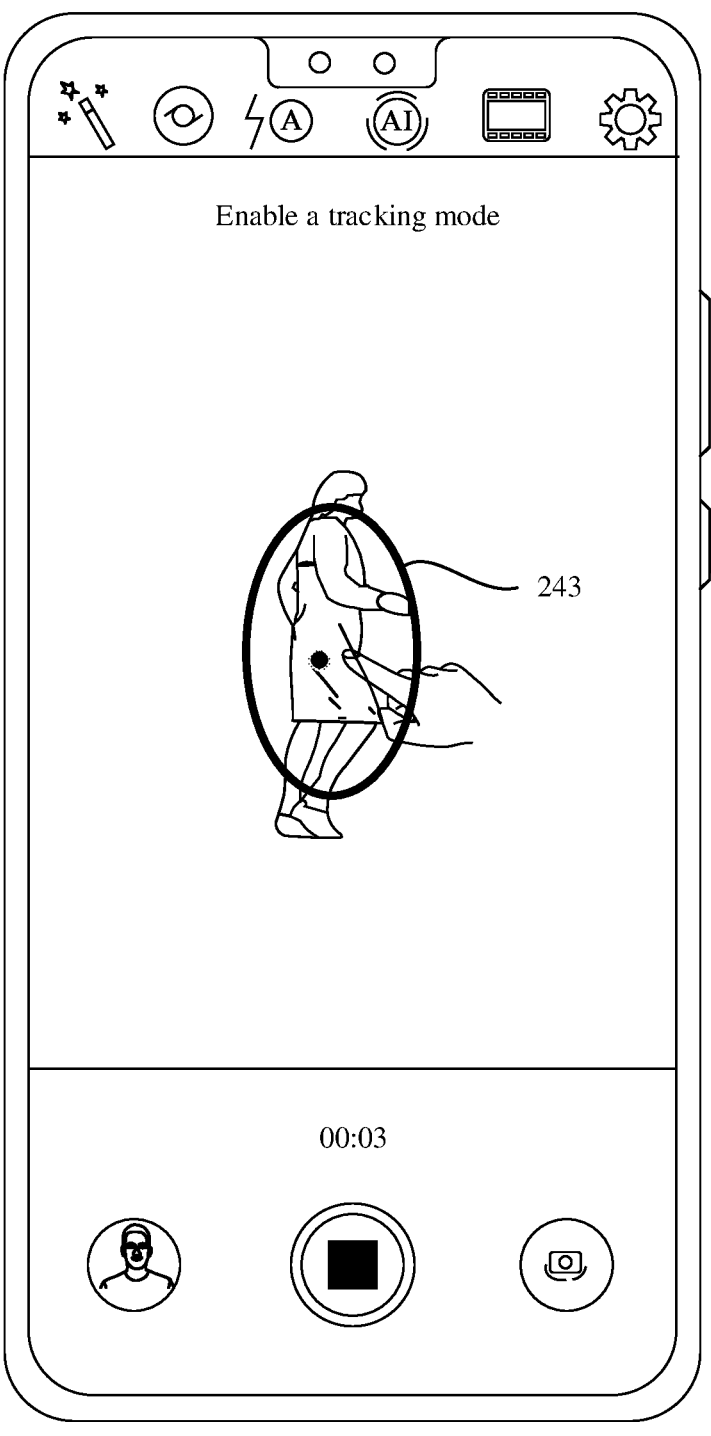

In some other embodiments, the user needs to touch and hold the person 244, so that the size of the target box 243 changes as the time changes. As shown in FIG. 2E, when the person 244 is still, the user continuously presses a touch position. As time increases, for example, the time control 242 changes from 00:02 in FIG. 2D to 00:03 in FIG. 2E, an area of the target box 243 gradually increases.

Figure 2F:
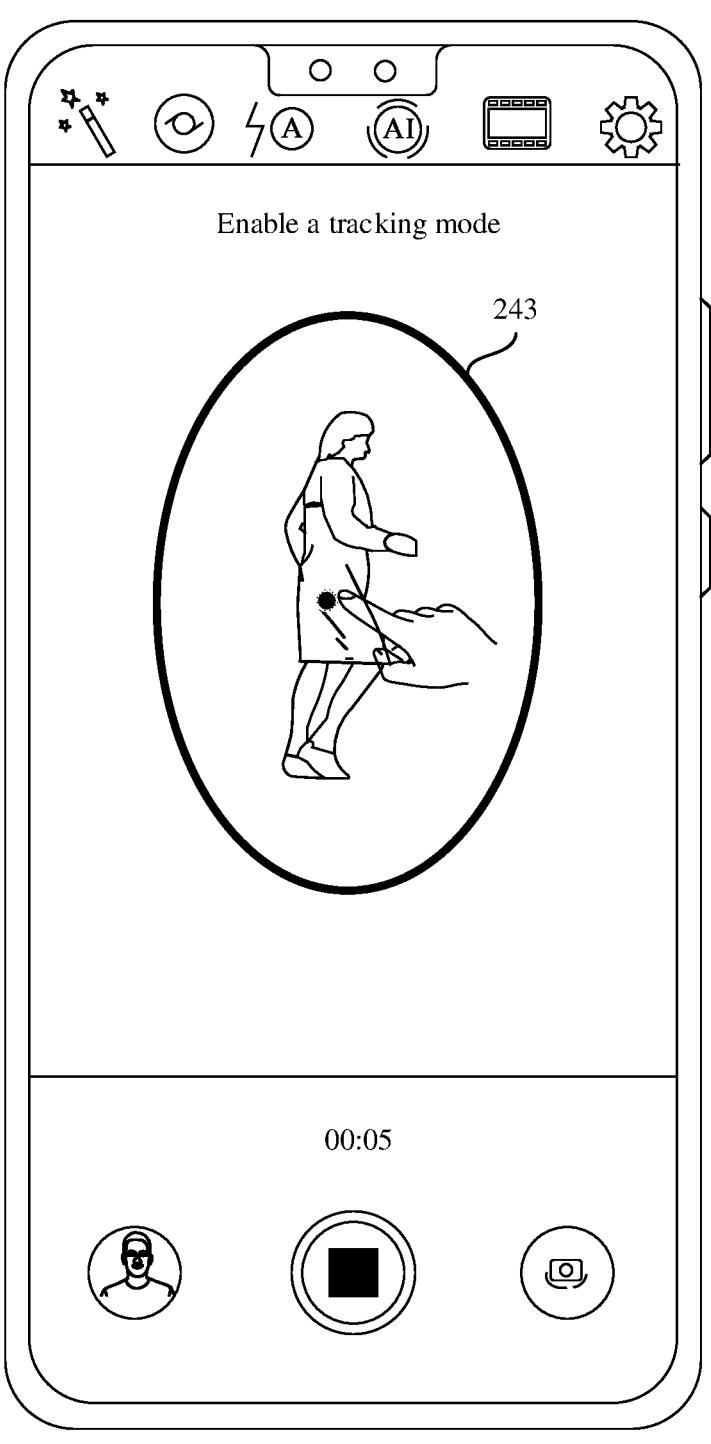

As time for the user to press the person 244 increases, as shown in FIG. 2F, the time control 242 increases from 00:03 in FIG. 2E to 00:05 in FIG. 2F, and the area of the target box 243 further increases compared with an area of the target box 243 in FIG. 2E, to cover a larger target range.

Figure 2G:
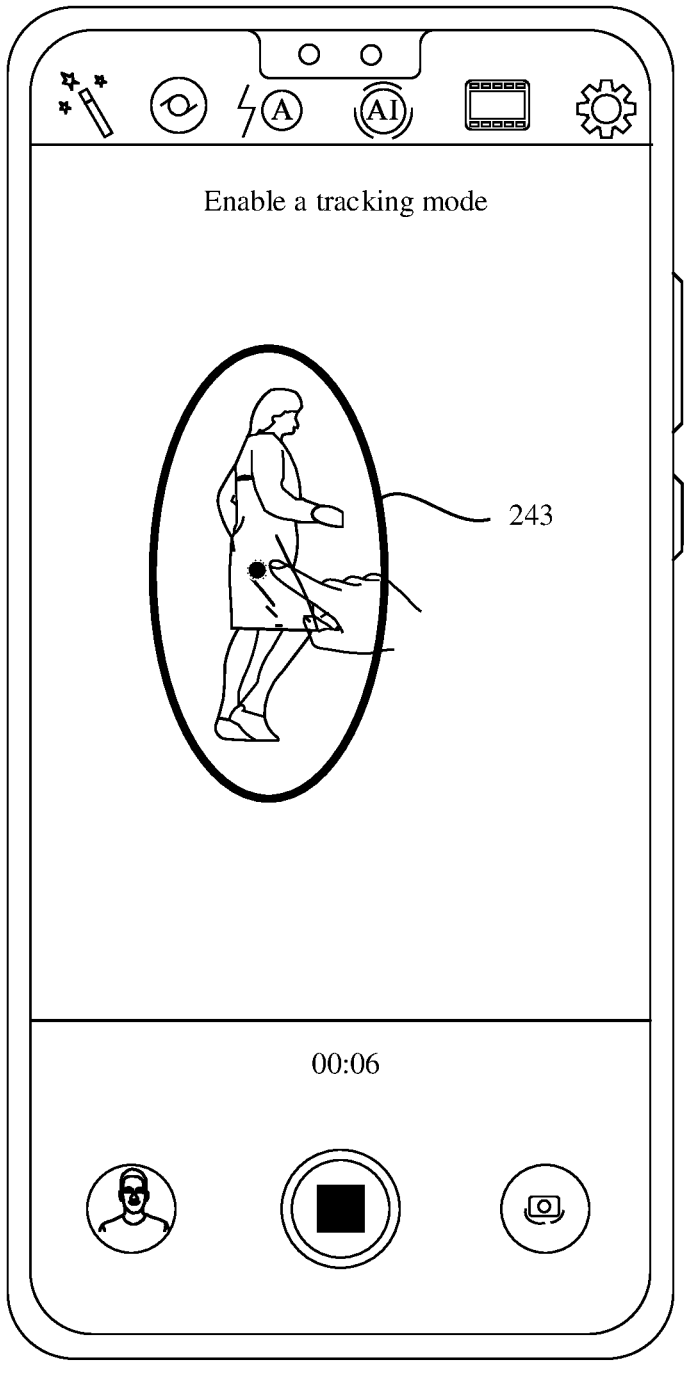

If the user continues to press the person 244 continuously, as shown in FIG. 2G, the time control 242 increases from 00:05 in FIG. 2F to 00:06, and the area of the target box 243 reduces compared with an area of the target box 243 in FIG. 2F.

In the foregoing embodiment, as the user continuously presses a target, the area of the target box 243 cyclically increases to decrease, as shown in FIG. 2D to FIG. 2G. It may be understood that, a maximum range in which the area of the target box 243 increases is an entire display interface of a video recording interface, and a minimum range of the target box 243 is a touch point of a screen when the user taps the target. An advantage of the foregoing embodiment is that the user can select the tracking target more freely, and the user can select the tracking targets of different sizes more conveniently.

Figure 2H:
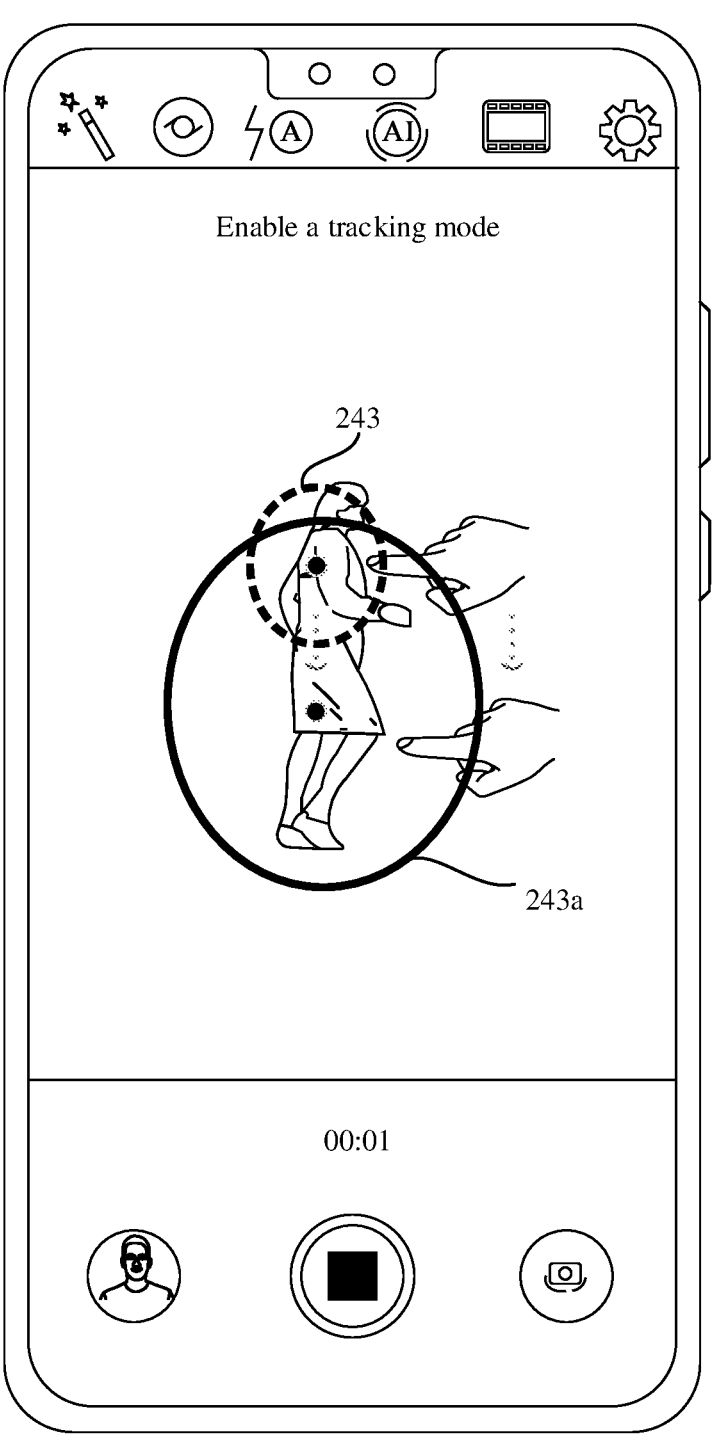

In some embodiments, when the tracking mode is enabled, when selecting the tracking target, if the user fails to tap a central position of the target, the user may drag a finger, to achieve an objective that the center of the target box 243 changes as the finger is dragged. As a central position of the target box 243 moves, the area of the target box 243 increases and decreases cyclically. As shown in FIG. 2H, the user initially taps an upper position of the person 244 to generate the initial target box 243. As the user drags the center of the target box 243 downward, the area of the target box 243 gradually increases, and is displayed as a target box 243*a*. It may be understood that in the foregoing embodiment, as long as the finger of the user does not leave the screen, the target box 243 that is centered on the position tapped by the user cyclically increases and decreases, and a drag gesture of the user and the change of the area of the target box 243 may be performed synchronously.

Figure 2I:
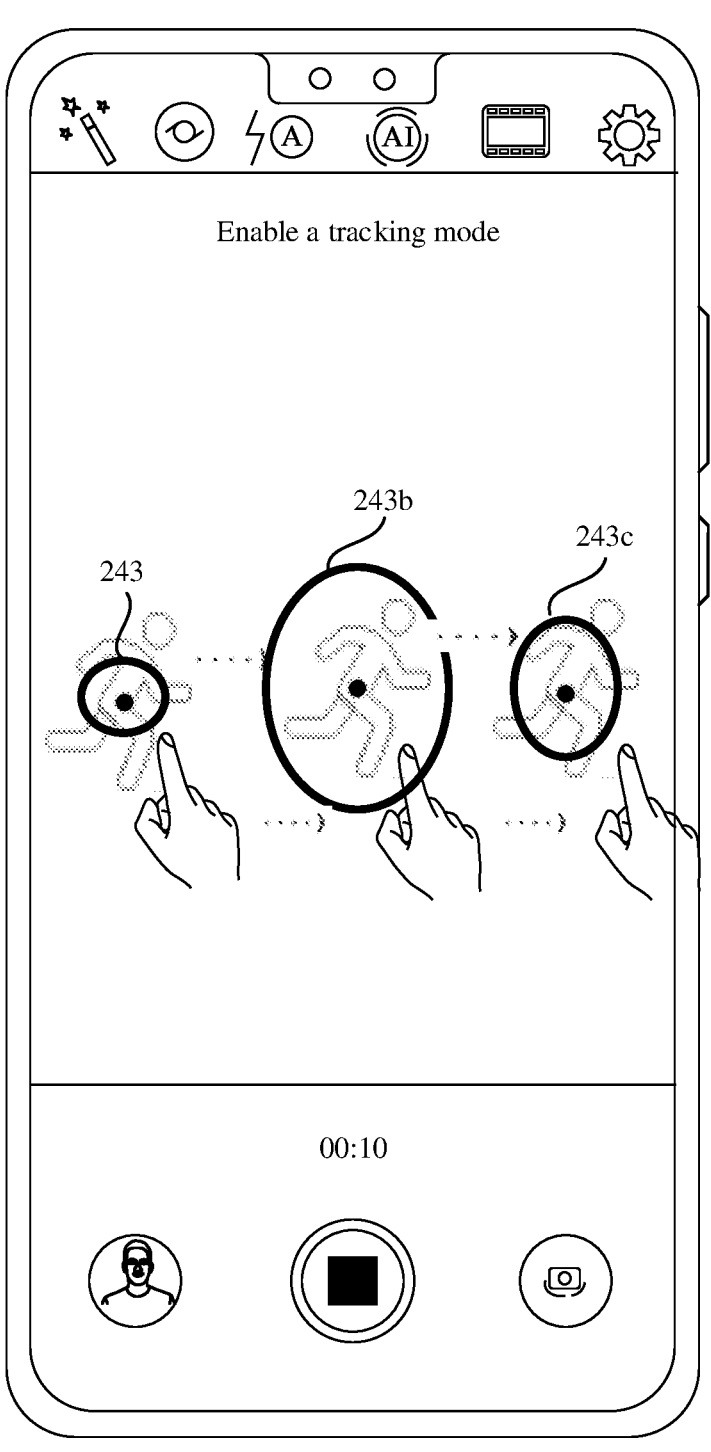

In some other embodiments, when the tracking mode is enabled, an object (for example, a person) in the video recording interface may move. In this scenario, a position at which the user taps the screen may move with movement of the object, or move with movement of the person, that is, the position at which the user taps the screen is always on the object and moves with the object. It may be understood that, in the foregoing scenario, the area of the target box 243 also cyclically increases and decreases as pressing time of the user increases. As shown in FIG. 2I, the person 244 moves from a leftmost side to a rightmost side of the video recording interface, and the user taps the person 244 when the person 244 appears on the leftmost side of the video recording interface, to generate the initial target box 243. As the person 244 moves to a middle position of the video recording interface, the finger of the user moves to a middle position of the screen along with the movement of the person 244, and the area of the initial target box 243 gradually increases and is displayed as a target box 243*b*. As the person 244 moves to the rightmost side of the video recording interface, the finger of the user moves to a right-side position of the screen along with the movement of the person 244, and an area of the target box 243*b* gradually decreases and is displayed as a target box 243*c*. In the foregoing embodiment, the user may select a moving object as a tracking target more conveniently.

Figure 2J:
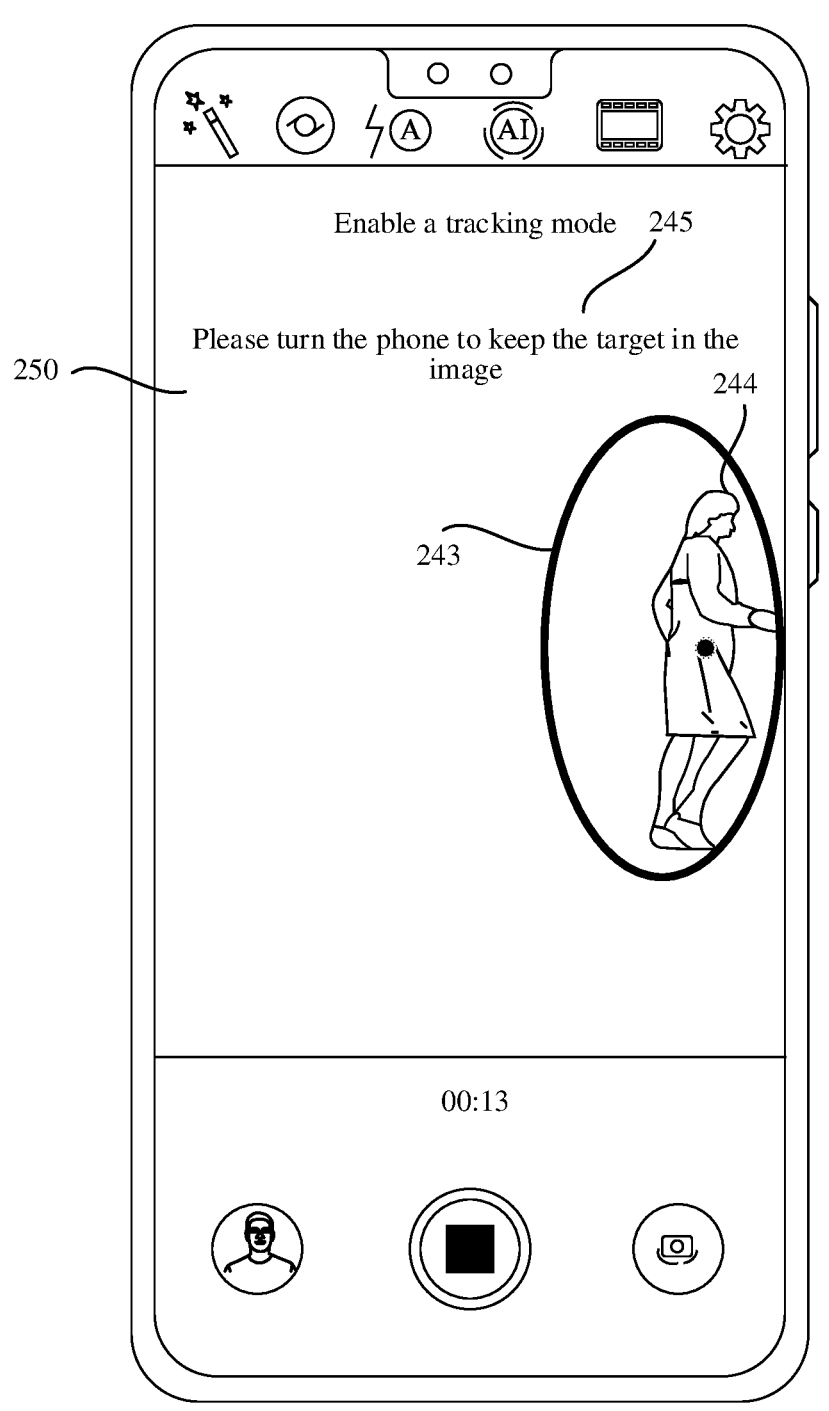

In some embodiments, when the tracking mode is enabled, the object (for example, the person) in the video recording interface may move outside the video recording interface. As a result, the tracking target cannot be determined because of a missing feature of the object. In the foregoing embodiment, when the object moves outside the video recording interface, a text prompt or an icon prompt that prompts the user to turn the electronic device appears in the video recording interface. As shown in FIG. 2J, in a video recording interface 250, the person 244 moves to an edge of the video recording interface 250. In this case, if the person 244 continues to move, the target box 243 cannot obtain a feature of the person 244, and therefore cannot determine the tracking target. When the electronic device detects that the person 244 moves to the edge of the video recording interface 250, a prompt 245 appears on the video recording interface 250. It may be understood that the prompt 245 may be in a text, an icon, or another form. This is not limited in this application. The prompt 245 may be: "Please turn the phone to keep the target in the image". In the foregoing embodiment, the electronic device may intelligently prompt the user, so that the user can avoid a case in which the tracking target cannot be determined because the user does not notice or does not know how to perform an operation.

The following describes some methods for determining a tracking target in this application.

Figures 3, 4:
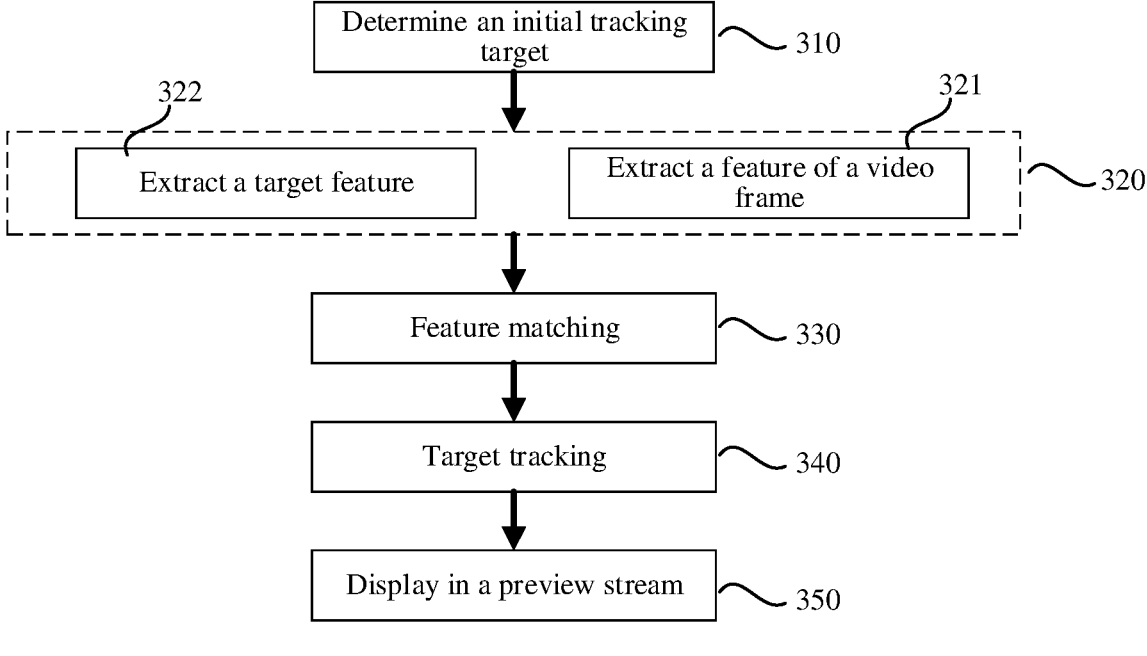
FIG. 3 is a schematic diagram of a method for implementing target tracking according to an embodiment of this application.
FIG. 4 is a schematic diagram of a feature vector of a tracking target according to an embodiment of this application.
Figure 5:
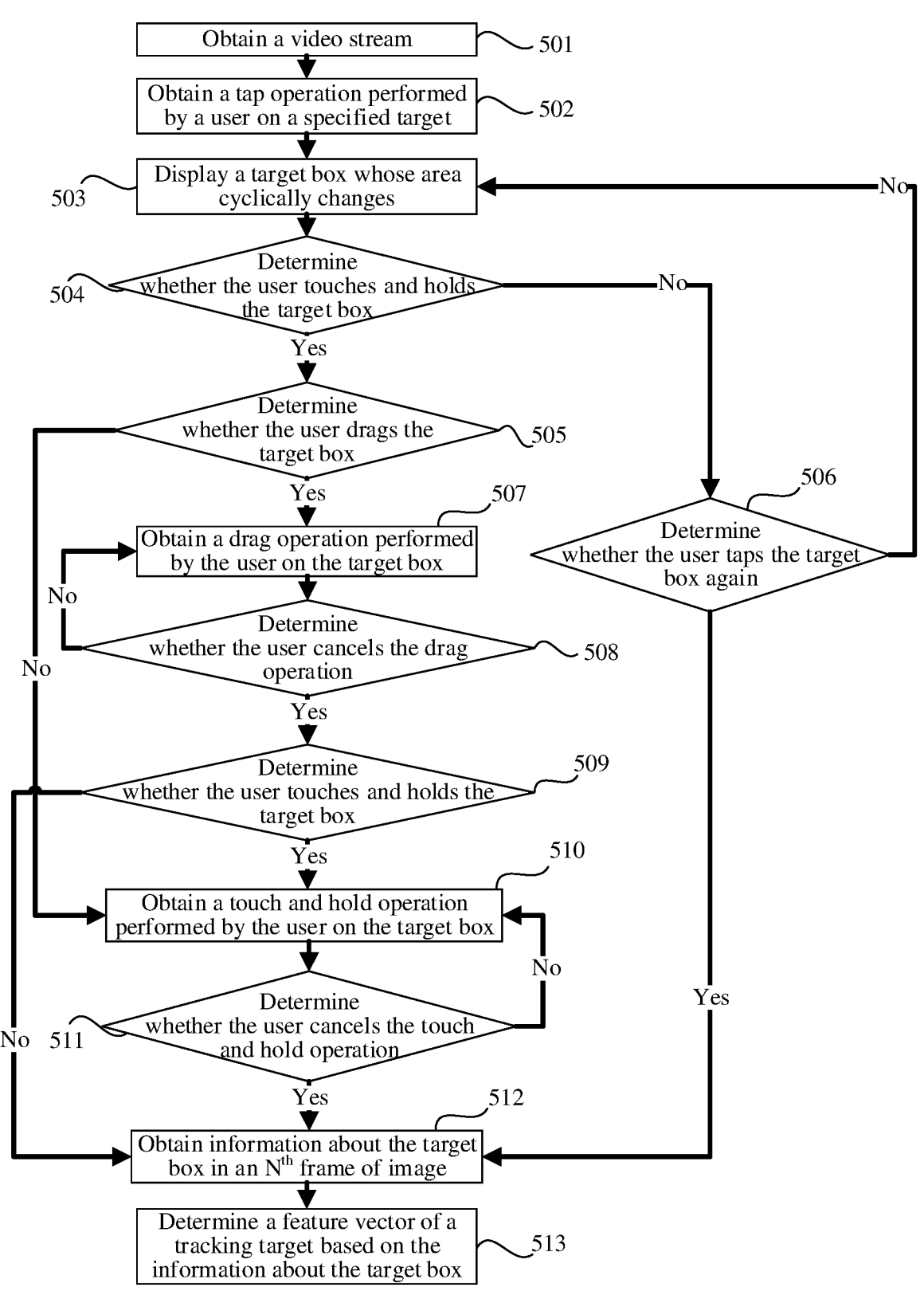
FIG. 5 is a flowchart of a method for determining a target box of a tracking target according to an embodiment of this application.

As shown in FIG. 3, a method for determining a tracking target by an electronic device in a tracking mode of video recording includes step S310. In step S310, the electronic device determines an initial tracking target. A specific method for determining the tracking target is described in the foregoing embodiments of this application, and details are not described herein again. After a user determines the tracking target, step S320 is performed.

In step S320, the electronic device separately extracts a feature of the tracking target and a feature of a current video frame. For example, the feature of the tracking target may be represented by a feature vector $F1(N)$, and the feature of the video frame may be represented by $F(N)$. The electronic device extracts $F1(N)$ in step S322, and extracts $F(N)$ in step S321.

In step S330, after obtaining the feature vector $F1(N)$ and the feature vector $F(N)$, the electronic device performs the foregoing feature matching algorithm and the center weighting algorithm to perform feature matching on $F1(N)$ and $F(N)$. As shown in FIG. 4, the electronic device may perform feature extraction on a tracking target image by using a feature extraction algorithm, to obtain and store a feature (for example, a texture feature, a contour feature, or a color feature) of the tracking target image. Specifically, a feature vector obtained by the electronic device by performing feature extraction on the tracking target image represents a feature of a tracking target corresponding to the tracking target image. A feature of a specified target (a person 244) in an $N^{th}$ frame of image may be represented by the feature vector $F1(N)$. The feature vector may represent a color feature, a texture feature, a contour feature, and another feature of the tracking target. For example, the feature vector $F1(N)$ may represent one or more of a texture feature, a contour feature, a color feature, and the like of the specified target (the person 244). A specific form and a size of the feature vector $F1(N)$ of the specified target (the person 244) are not limited herein. For example, $F1(N)$ may be a feature vector $[0.5, 0.6, 0.8, \ldots, 0.9, 0.7, 0.3]$ that includes n numerical values. n is an integer, and may be 128, 256, 512, or the like. A value of n is not limited. After extracting the feature of the specified target (the person 244), the electronic device stores the feature of the specified target (the person 244) in a tracking template, and the tracking template stores the feature vector $F(N)$.

The tracking template may be used to represent one or more features of the tracking target. After the electronic device extracts the feature of the tracking target, the electronic device stores the feature of the tracking target in the tracking template. In subsequent consecutive video frames, the electronic device matches the feature of the specified target in the image frame with the feature of the tracking target in the tracking template.

In step S340, if the matching succeeds, the electronic device determines the specified target as the tracking target in the image frame. After the user specifies the tracking target, the electronic device tracks the tracking target in an image frame after the $N^{th}$ frame of image.

The following describes how the electronic device tracks the tracking target.

The electronic device may track the tracking target in any manner.

In the consecutive image frames after the $N^{th}$ frame of image, the electronic device uses a center of a target box 243 in a previous frame of image as a search center, and the tracking target is tracked by using M times a size of the target box as a search region. The electronic device obtains a response value of each pixel in the search region based on the feature of the tracking target and the pixel in the search region. If a maximum response value corresponding to the pixel in the search region is greater than a preset response value, the tracking target exists in the search region. The electronic device marks a position of the tracking target in the frame of image. Then, the electronic device automatically focuses on the tracking target, so that the tracking target can be shot more clearly.

In step S350, after the electronic device determines a central point of the tracking target in an $(N+1)^{th}$ frame of image, the electronic device uses the central point of the tracking target as a center, and performs cropping on the obtained $(N+1)^{th}$ frame of image by using a cropping box with a determined size, to obtain a new image. Usually, a preset size of the cropping box is larger than the size of the target box 243. For example, the preset size of the cropping box may be half or three-quarters of a size of an original image obtained by the electronic device. The preset size of the cropping box is not limited in this application.

In some embodiments, after the electronic device marks a position of the tracking target in the $(N+1)^{th}$ image frame on a video recording interface, a category corresponding to the specified target may be displayed on or around the position of the tracking target.

In a preview stream of the electronic device, the new cropped image is displayed.

The following describes some methods for determining a target box in this application.

In step S501, an electronic device first obtains a video stream, where the video stream includes N image frames.

In step S502, the electronic device obtains a first operation (for example, a tap operation) performed by a user on a target object on a screen, and step S503 is performed. It may be understood that the target object may be a static or moving object, a person, an animal, or the like. This is not limited in this application.

In step S503, after the tap operation is performed by the user, a video recording interface displays a target box whose area continuously and cyclically changes (for example, whose size changes) and that is centered on a tap point. It may be understood that, as long as a finger of the user does not leave the screen of the electronic device, the video recording interface continuously and cyclically displays the target boxes with different area sizes. In addition, a maximum area and a minimum area of the target box are described in the foregoing embodiments, and details are not described herein again. Step S504 is performed.

In step S504, the electronic device determines whether the user touches and holds the screen, or determines whether the user touches and holds the target box. It may be understood that the touch and hold operation herein is a continuous pressing of the finger of the user on the screen of the electronic device. If the user does not touch and hold the target box, S506 is performed. If it is determined that the user touches and holds the target box, step S505 is performed.

In step S506, because the user does not touch and hold the target box, the electronic device determines whether the user taps the target box again. If the user does not tap the target box again, step S503 is returned. If the user taps the target box again, step S512 is performed.

In step S505, because it is determined that the user touches and holds the target box, a next step is to determine whether the user drags the target box. If the user drags the target box, step S507 is performed. If the user does not drag the target box, step S510 is performed.

In step S507, because it is determined that the user drags the target box, the electronic device obtains a drag operation performed by the user on the target box, and then step S508 is performed.

In step S508, the electronic device determines whether the user cancels the drag operation. If the user does not cancel the drag operation, step S507 is returned. If the user cancels the drag operation, step S509 is performed.

In step S509, the electronic device determines again whether the user touches and holds the target box after dragging the target box. If the target box is not continuously touched and held, step S512 is performed. If the target box is still touched and held after the user drags the target box, step S510 is performed.

In step S510, the electronic device obtains the touch and hold operation performed by the user on the target box, and step S511 is performed.

In step S511, the electronic device determines whether the user cancels the touch and hold operation performed on the target box. If it is determined that the touch and hold operation is not canceled, step S510 is returned to continue obtaining the touch and hold operation performed by the user on the target box. If it is determined that the user cancels the touch and hold operation, step S512 is performed.

In step S512, the electronic device obtains information (including but not limited to area size information and position information) about a target box in an $N^{th}$ frame of image. Step S513 is performed.

In step S513, the electronic device determines a feature vector of a tracking target based on the area size and the position information that are of the target box and that are obtained in step S512. A method for determining the feature vector of the tracking target is shown in the embodiment in FIG. 3, and details are not described herein again.

It may be understood that a sequence of the foregoing steps does not constitute a limitation on this embodiment, that is, a part of the foregoing steps may not be included in this embodiment, and the foregoing steps may alternatively be combined to different degrees based on a requirement.

For other content, refer to the descriptions of the foregoing related content, and details are not described again.

It may be understood that, to implement the foregoing functions, the electronic device and the like include corresponding hardware structures and/or software modules for performing the functions. A person skilled in the art should be easily aware that, in combination with the examples described in embodiments disclosed in this specification, units and algorithm steps may be implemented by hardware or a combination of hardware and computer software in embodiments of this application. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of embodiments of the present invention.

In embodiments of this application, division into functional modules may be performed on the electronic device and the like based on the foregoing method examples. For example, division into each functional module may be performed based on each corresponding function, or two or more functions may be integrated into one processing module. The integrated module may be implemented in a form of hardware, or may be implemented in a form of a software functional module. It should be noted that, in embodiments of the present invention, division into the modules is an example and is merely logical function division, and may be other division in an actual implementation. An example in which division into each functional module may be performed based on each corresponding function is used below for description.

All or some of the methods in embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, a network device, an electronic device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, an SSD), or the like.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application should be subject to the protection scope of the claims.

What is claimed is:

1. A method, comprising:
obtaining N frames of images via a camera of an electronic device;
obtaining a first operation performed by a user on a target object on a screen of the electronic device, wherein the first operation comprises a tap on the screen;
displaying a target box on the screen, wherein the target box is centered at a touch point tapped by the user on the screen in the first operation, the target box cyclically increases and decreases when the user maintains touch contact with the screen, a maximum area of the target box comprises an entire display interface on the screen, and a minimum area of the target box comprises the touch point;
obtaining information about the target box in an Nth frame of image based on a second operation performed by the user on the target object; and
determining a feature vector of the target object based on the information about the target box.

2. The method according to claim 1, wherein after displaying the target box whose area cyclically changes, the method further comprises:
determining whether the user performs a third operation on the target object; and
when it is determined that the user performs the third operation, determining whether the user performs a fourth operation on the target object.

3. The method according to claim 2, comprising:

when it is determined that the user does not perform the third operation on the target object, determining whether the user performs the second operation; and performing the following:

when it is determined that the user does not perform the second operation, continuously displaying the target box whose area cyclically changes; or when it is determined that the user performs the second operation, obtaining the information about the target box in the Nth frame of image.

4. The method according to claim 2, comprising:

when it is determined that the user performs the fourth operation on the target object, obtaining the fourth operation;

determining whether the user cancels the fourth operation; and performing the following:

when it is determined that the user does not cancel the fourth operation, continuously obtaining the fourth operation performed by the user on the target object; or when it is determined that the user cancels the fourth operation, determining whether the user performs the second operation on the target object.

5. The method according to claim 2, comprising:

when determining that the user does not perform the fourth operation on the target object, obtaining the second operation performed by the user on the target object.

6. The method according to claim 4, comprising:

when the user performs the second operation on the target object, obtaining the second operation;

determining whether the user cancels the second operation; and when it is determined that the user does not perform the second operation on the target object, obtaining the information about the target box in the Nth frame of image.

7. The method according to claim 6, comprising:

when it is determined that the user cancels the second operation, obtaining the information about the target box in the Nth frame of image; or when it is determined that the user does not cancel the second operation, continuously obtaining the second operation.

8. The method according to claim 2, wherein the second operation is a secondary tap operation, the third operation is a touch and hold operation, and the fourth operation is a drag operation.

9. The method according to claim 1, wherein the information about the target box comprises an area and a position of the target box.

10. A terminal device, comprising:

at least one processor; and at least one memory, the at least one memory comprising instructions that when executed by the at least one processor, cause the terminal device to:

obtain a first operation performed by a user on a target object on a screen of the terminal device, wherein the first operation comprises a tap on the screen;

display a target box on the screen, wherein the target box is centered at a touch point tapped by the user on the screen in the first operation, the target box cyclically increases and decreases when the user maintains touch contact with the screen, a maximum area of the target box comprises an entire display interface on the screen, and a minimum area of the target box comprises the touch point;

obtain information about the target box in an Nth frame of image based on a second operation performed by the user on the target object; and determine a feature vector of the target object based on the information about the target box.

11. The terminal device according to claim 10, wherein when the instructions are executed by the at least one processor, the instructions further cause the terminal device to:

determine whether the user performs a third operation on the target object; and when it is determined that the user performs the third operation, determining whether the user performs a fourth operation on the target object.

12. The terminal device according to claim 11, wherein when the instructions are executed by the at least one processor, the instructions further cause the terminal device to:

when it is determined that the user does not perform the third operation on the target object, determine whether the user performs the second operation; and perform the following:

when it is determined that the user does not perform the second operation, continuously display the target box whose area cyclically changes; or when it is determined that the user performs the second operation, obtain the information about the target box in the Nth frame of image.

13. The terminal device according to claim 11, wherein when the instructions are executed by the at least one processor, the instructions further cause the terminal device to:

when it is determined that the user performs the fourth operation on the target object, obtain the fourth operation;

determine whether the user cancels the fourth operation; and perform the following:

when it is determined that the user does not cancel the fourth operation, continuously obtain the fourth operation performed by the user on the target object; or when it is determined that the user cancels the fourth operation, determine whether the user performs the second operation on the target object.

14. The terminal device according to claim 11, wherein when the instructions are executed by the at least one processor, the instructions further cause the terminal device to:

when it is determined that the user does not perform the fourth operation on the target object, obtain the second operation performed by the user on the target object.

15. The terminal device according to claim 13, wherein when the instructions are executed by the at least one processor, the instructions further cause the terminal device to:

when it is determined that the user performs the second operation on the target object, obtain the second operation;

determine whether the user cancels the second operation; and when it is determined that the user does not perform the second operation on the target object, obtain the information about the target box in the Nth frame of image.

16. The terminal device according to claim 15, wherein when the instructions are executed by the at least one processor, the instructions further cause the terminal device to:

when it is determined that the user cancels the second operation, obtain the information about the target box in the Nth frame of image; or when it is determined that the user does not cancel the second operation, continuously obtain the second operation.

17. The terminal device according to claim 11, wherein the second operation is a secondary tap operation, the third operation is a touch and hold operation, and the fourth operation is a drag operation.

18. The terminal device according to claim 10, wherein the information about the target box comprises an area and a position of the target box.

19. The method according to claim 9, further comprising:

performing target tracking in a consecutive frame after the Nth frame of image based on a search center and a search region, wherein the search center is the touch point, and the search region is an enlarged region of the area of the target box.

20. The terminal device according to claim 18, wherein when the instructions are executed by the at least one processor, the instructions further cause the terminal device to:

perform target tracking in a consecutive frame after the Nth frame of image based on a search center and a search region, wherein the search center is the touch point, and the search region is an enlarged region of the area of the target box.

\* \* \* \* \*